Patented Mar. 8, 1938

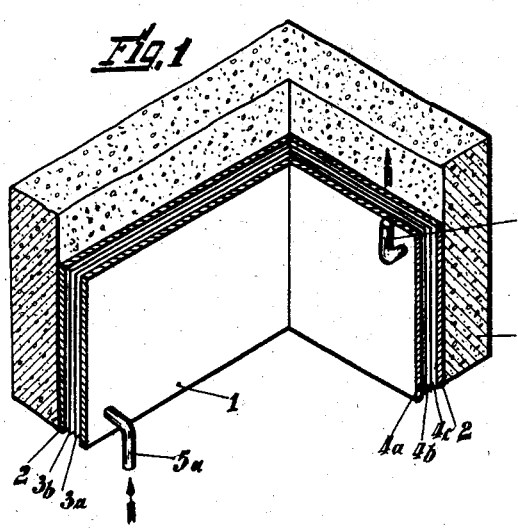
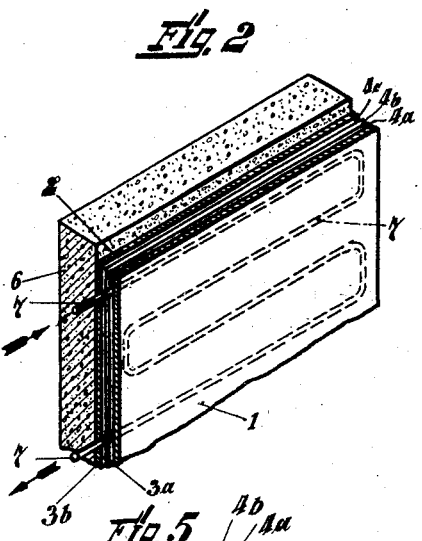
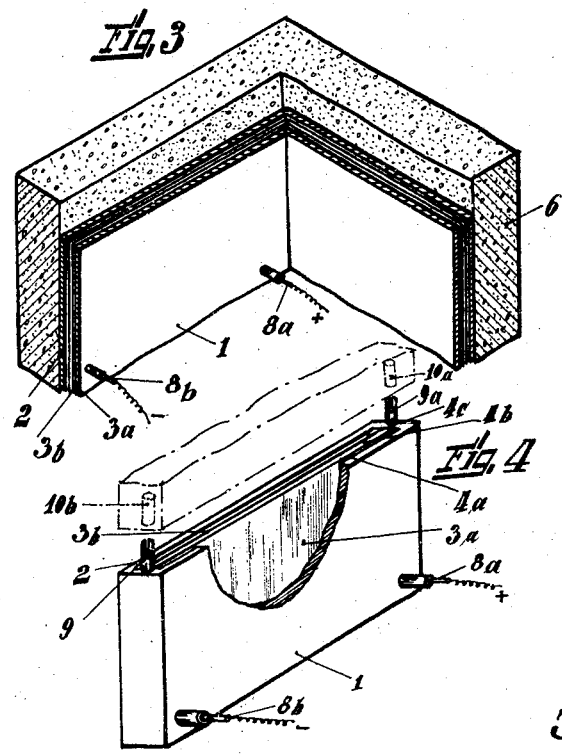
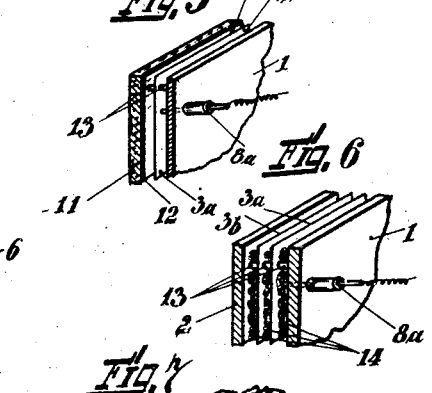
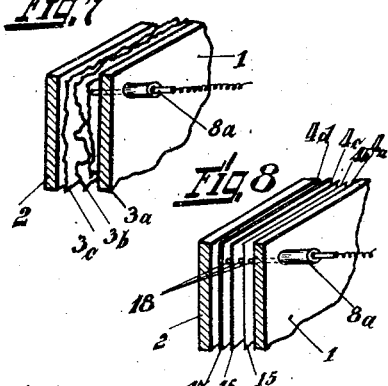

2,110,660

UNITED STATES PATENT OFFICE 2,110,660

HEATING THERMAL INSULATION

Rudolf Doczekal, Vienna, Austria, assignor to N. V. Internationale Alfol-Maatschappij, Amsterdam, Netherlands, a Dutch company Application November 27, 1935, Serial No. 51,741
In Austria November 28, 1934

5 Claims. (Cl. 219—19)

My invention relates to an insulation, protecting against heat transfer and acting at the same time as heating element of a room that is to be heated.

More especially the invention concerns a thermal insulation containing one or several gas layers. For this kind of thermal insulation bright metallic sheets or foils are preferably employed as bounding or dividing surfaces. The sheets or foils may consist either wholly of metal or they may be coated only on the surface with a metallic cover. For instance preferably thermal insulating materials may be coated at least on one of their surfaces with metal in shape of a foil or metallic powder or a varnish containing a metallic powder.

This kind of thermal insulation has a very high insulating value, but it may sometimes occur that at the surface or occasionally also in the interior of the insulation moisture is formed, effecting a reduction of the insulating value and in course of time even a corrosion of the metallic surfaces.

By my invention the above mentioned disadvantages are eliminated and simultaneously further advantages are obtained. According to the invention I provide means in order to bring one or several gas layers of the insulation to a higher temperature than the warmer one of the media adjacent to the insulation. For this purpose, various means are employed. It is possible to bring at least one of the air layers located between the sheets or foils of the insulation to increased temperatures by introduction of a warm medium; one may also arrange within at least one of the gas layers a tube or an equivalent means through which flows a heated means.

One form of the invention consists in that at least one of the gas layers, bounded by the metallic surfaces, is brought to the required higher temperature by electric current. For this purpose for instance resistance wires may be employed. It is however more advantageous to heat directly by electric current at least one of the metallic surfaces, which may consist of metallic sheets, foils or other materials covered with metal in the form of foils or powder. The heat imparted to the sheets or foils is transferred to the adjacent gas layers of the insulation. The insulation acts in this way as heating element.

The above described invention may be employed preferably as lining of walls of any material. According to the invention heating media of only slightly higher temperature may be employed than the temperature of the room that is to be heated and insulated; furthermore a very even distribution of heat is secured. Simultaneously an even and constant insulating effect is obtained by the invention; formations of moisture on the surface of the lining certainly are avoided.

The invention however may also be used in other fields, for example sleeping bags, pilots' over-alls, vehicles, aeroplanes etc. may be provided with my invention.

According to the invention the bright metallic surfaces, employed for bounding the air-layers within the insulation are separated by non-metallic materials. The metallic surfaces turned toward the room that may be heated or turned toward the warmer medium are heated according to the invention so that the temperature of the wall coincides approximately with the temperature of the adjoining room.

If the heating of at least one of the gaseous spaces is effected by introduction of a heated medium, air as well as gases or vapors may be employed.

If the heating is effected electrically, by leading an electric current through at least one of the foils or sheets, the electrically heated metal-sheets must be insulated by electrically insulating mediums one against the other. For this purpose for instance one of the metallic surfaces may be fitted with an electrically insulating coating. For these coatings all electrically insulating materials can be used, but those materials are preferably used, which are pliable and elastic. Those materials are mostly advantageous which do not influence or do not substantially influence the value of emissivity of the bright metallic surface. Such coatings may also be employed on both sides of the metallic sheets. Of particular advantage are metallic surfaces which according to the known art, are covered with a transparent oxide-layer. Such oxide-layers are, as has been found, also electrically insulating. As to this manner of performance, the metallic sheets or foils may also be corrugated or arranged in an irregularly crumpled state, and it is of no importance when the bright surfaces of the electrically heated foils touch the foils not electrically heated.

In case of several bright metallic sheets or foils being electrically heated, the thickness of the foils or sheets may be graduated in such manner that different quantities of heat may be generated in the various metallic foils or sheets. In this case it is advisable to graduate the thickness of the foils or sheets so that the thinnest is next to the room that is to be heated and insulated.

The gas layers of the insulation may also be filled with a loose or porous material, which may be electrically insulating. The gas layer, in this case, is subdivided in numerous small cells or pores, which counteract the convection. As suitable materials are to be recommended peat, cork, glass-wool, slagwool, asbestos, etc. in any shape or form.

The insulation may furthermore comprise sheets of common insulating materials, as for example, of cork, asbestos, etc. in addition to air-spaces, which are bounded and subdivided from each other by bright metallic surfaces.

The insulation according to my invention may also be employed for example for electrically heatable building panels: such panels are fitted as inner lining to walls of different materials. The heating of the metallic surfaces may be regulated by thermostats.

Furthermore the heating insulation according to my invention may be used for coatings of outer walls of a room that is to be heated. In such cases the brick-work serves as heat accumulator. This use of the invention has the advantage that for the heating cheap night-current may be used. For a better transmission of heat to the air of the inner room, air circulation passages may be arranged in the wall of brickwork, which may be closed for regulation.

In covering the outer walls or brickwork with the insulation the accumulating effect of the insulation can be employed during the hot season to hold a constant low temperature.

The simplest form of the invention consists in that one side of the gas layer is bounded by a well known insulating material, whilst the boundary on the other side includes a single sheet or foil which is electrically heated. This sheet or foil may consist wholly of metal; it suffices however if it is covered on that side, which is turned towards the gas-layer with a metal in the form of a foil, metallic powder or the like. In such case some advantage may result from the fact that the metallic face is turned away from the room, for this results in the greater heat radiation of the non-metallic face serving to transmit heat to the room.

The heating insulation may be used for instance also for construction of floors or ceilings and for window-shutters. The heating may only be effected in winter, whilst in summer the insulation is serving only as protection against heat. By the many possibilities of the application of the invention, especially for heating purposes and thermal insulation, considerable advantages may be effected in comparison with the existing insulations.

All further details of my invention may be seen by the annexed illustrations which simply serve as explanation and not as a limitation of my invention.

Fig. 1 shows a wall of brickwork 6 which has an inner lining or facing element 1. Spaced away from the lining element 1 is a sheet or foil 3a and spaced away from foil 3a is a similar sheet or foil 3b. The supports for these foils are not shown. Likewise spaced from the foil or sheet 3b is a sheet 2 carried by the brickwork 6. It will be seen that this results in the formation of three gas layers 4a, 4b and 4c formed by the covering elements 1 and 2 and the subdividing sheets or foils. In this particular example, the gas layer 4a is fed by a heated fluid which enters through the tube 5a and goes out through tube 5b. The sheets or foils 3a and 3b may consist wholly of a metal or they may consist of a non-conducting material coated with metal on one or both sides.

Fig. 2 illustrates the employment of an insulation, heated in another way. The arrangement is like that of Fig. 1, but the gas layer 4a is provided with a heating tube 7, which is fed by any suitable heated medium. By this means the gas layer 4a is indirectly heated.

Fig. 3 shows a similar arrangement of insulation of a wall 6, by which the subdividing sheets may consist of metal sheets or foils or of non-conducting sheets 3a, 3b, covered on one or both sides with metal. The subdividing sheet 3a is heated by an electric current and brought thereby to the required temperature. The electric current enters at the positive pole 8a and leaves the insulation at the negative pole 8b.

Fig. 4 shows an insulating panel, which is manufactured according to the invention and is employed for building purposes. The panel consists of an outer-sheet 1, which is partly broken off for the purpose of better understanding, and inner-sheet 2, which may be made of any suitable stable material. The whole sheet is provided with a frame, which for reason of a better understanding is not shown.

The spaced foils 3a, 3b form air spaces 4a, 4b and 4c. The foil 3a is heated by an electric current entering at the positive pole 8a and leaving at the negative pole 8b. On the upper border of the insulating panel a positive plug 9a and a negative plug 9b are provided, which may be put into the sockets 10a, 10b of another insulating panel, which may be mounted on the first panel. By this means a larger number of panels may be put one on top of the other and a free passing of the current may be achieved through the foils 3a of all insulating panels.

Further particularities of my invention are to be found in Figures 5 to 8.

Fig. 5 shows a bounding sheet 11, which may consist of one of the known, non-conducting insulating materials, for example of cork or asbestos sheets or some similar materials. This sheet is covered on the inside by a foil 12. Between this sheet 11 of insulating material and another bounding plate 1 a single bright metal-foil or a foil of another material coated with a metallic surface is arranged. The positioning distance of this foil 3a and by it the thickness of the two gas-layers 4a, 4b is secured by spacer pieces 13. The foil 3a may be heated by electric current entering at 8a.

In some cases it is to be recommended to modify the resistance of the foil passed by the electric current. This may be effected by changing the thickness of the foil, or by slots in the foil.

In Fig. 6 an insulating panel is illustrated, showing two metallic subdividing foils 3a and 3b between the two bounding plates 1 and 2. The gas-layers 4a, 4b and 4c, the thickness of which is secured by spacers 13 are filled with a non-conducting fibre-like material, for example with glass-wool or loose asbestus fibres 14.

In Fig. 7 a further illustration of my invention is shown. Between the two bounding sheets 1 and 2, three metallic foils 3a, 3b and 3c are provided, which are crumpled irregularly and therefore are spaced without any special supports. These foils may preferably consist of pure metal, for example of aluminum. They may be covered at at least one, preferably both sides by a coating, not substantially influencing the radiation, for example by a varnish of nitro or acetyl cellulose. In using aluminum one may also produce a transparent coating of aluminium-oxide on the surface of the foils. This coating is electrically insulating. It is absolutely necessary that those foils, which are heated by electric current, have such an electric insulation.

In Fig. 8 another form of my invention is shown. Between the two bounding sheets 1 and 2, three subdividing sheets 15, 16, 17 are provided. By this means air-spaces 4a, 4b, 4c, 4d are formed. The electric current enters at the switch 8a and is conducted to all three subdividing sheets 15, 16 and 17. The latter ones are of a different thickness. The subdividing sheet 15, being thin, consists for example of a bright metallic foil. The sheet 16 consists of a thicker foil or of a thin plate. The plate 17 consists of a preferably thicker sheet metal or plate. By this means the three subdividing sheets 15, 16 and 17 offer a different resistance to the electric current. The subdividing sheet 15, being the thinnest, has the greatest resistance, and it is therefore heated to the highest temperature.

It is to be noted that in the construction here described, I supply wall elements which define a space or area which is kept at an elevated temperature, such for example as the room of a house or the interior of other types of structures (not necessarily buildings) such as are referred to above. The inside of the wall construction is lined with an insulating structure of a general type such as that which is described in Schmidt Patent No. 1,757,479, in which a plurality of air spaces are formed. One of these spaces, which is separated from the outer wall construction by at least one other such space to serve as insulation, is so connected to a source of heat that the temperature of the air in this space can be brought to a temperature which is higher than that of the inner facing element (the wall of the room). This means that heat will be delivered by convection from the air in this space to its adjacent wall members and slowly transmitted into the inside space (the room), and since this space is largely surrounded by this thin layer of heated air which in turn is surrounded by insulating spaces, it will be obvious that substantially no heat will pass from this inner space (the room) through the outer wall elements. As a result, an exceedingly even temperature can be maintained in the inside space and the use of high temperatures in the heating zone can be avoided.

Having now particularly described and ascertained the nature of my said invention and in what manner the same is to be performed, I declare that what I claim is:—

1. A wall construction comprising outer wall elements defining a space to be maintained at an elevated temperature and an inner lining for such wall elements comprising a plurality of layers of thin sheeted material having a heat-reflective surface arranged in spaced relation to form a plurality of air spaces and an inner facing element covering such sheeted material, and means whereby the air in one of the inner of said spaces may be brought to a temperature above the temperature of said inner facing elements whereby heat may be caused to flow slowly from said heated air space to the space defined by said wall construction, and the flow of heat from said defined space through said wall construction to the outer wall elements will be substantially prevented.

2. A structure as specified in claim 1 in which the sheeted material separating the air spaces comprises a thin metallic foil and in which the structure comprises means for passing electricity through at least one layer of such foil to heat an air space adjacent thereto.

3. A structure as specified in claim 1, in which the thin sheeted material separating the air spaces consists of an insulating member and a facing member of metallic foil attached thereto so as to face toward the inner defined space and which further includes means for passing electricity through such foil and heating the same.

4. A structure as specified in claim 1, in which the means for heating the air in the space to be heated comprises means for withdrawing air from said space and admitting additional heated air into such space.

5. A structure as specified in claim 1 in which the means for heating the air in said space to be heated comprises a tube interposed in said space and means for heating said tube.

RUDOLF DOCZEKAL.

CERTIFICATE OF CORRECTION.

Patent No. 2,110,660. March 8, 1938.

RUDOLF DOCZEKAL.

It is hereby certified that error appears in the printed specification of the above numbered patent requiring correction as follows: Page 2, second column, line 9, after "medium" and before the period insert the words or may be heated electrically; and that the said Letters Patent should be read with this correction therein that the same may conform to the record of the case in the Patent Office.

Signed and sealed this 12th day of April, A. D. 1938.

(Seal)

Henry Van Arsdale,
Acting Commissioner of Patents.